United States Patent Office 3,448,163
Patented June 3, 1969

3,448,163
DISPROPORTIONATION OF OLEFINS
Eric James Howman, Crowthorne, and Leonard Turner, Woking, England, assignors to The British Petroleum Company Limited, London, England, a corporation of England
No Drawing. Filed Apr. 7, 1966, Ser. No. 540,823
Claims priority, application Great Britain, Apr. 23, 1965, 17,221/65
Int. Cl. C07c 3/62
U.S. Cl. 260—683                                         9 Claims

ABSTRACT OF THE DISCLOSURE

A process for disproportionating acyclic olefins is provided which comprises contacting an acylic olefin with a catalyst which has been prepared by impregnating alumina with a solution of rhenium heptoxide in an organic solvent and removing the solvent, said solvent being selected from the group consisting of aliphatic alcohols having 1 to 4 carbon atoms per molecule, aliphatic ketones and ethers having up to 4 carbon atoms per molecule, dioxan and tetrahydropyran.

---

This invention relates to the preparation of catalysts and particularly to the preparation of catalysts comprising rhenium heptoxide and alumina which are useful for effecting the disproportionation of acyclic olefins.

The disproportionation of acyclic olefins using a catalyst consisting essentially of rhenium heptoxide and alumina is known. So far as the preparation of such catalysts is described it is stated that they may be conveniently prepared by mixing a solution of ammonium perrhenate and alumina and heating to convert the perrhenate to the heptoxide.

It has now been found that catalysts comprising rhenium heptoxide and alumina may be prepared which have high activity and greater selectivity than the catalysts prepared from ammonium perrhenate.

According to one aspect of the present invention there is provided a process for the preparation of a rhenium oxide catalyst which comprises impregnating alumina with a solution of rhenium heptoxide in an inert organic solvent selected from aliphatic alcohols having 1–4 carbon atoms per molecule e.g. methanol or ethanol, aliphatic ketones and ethers having up to 4 carbon atoms per molecule, dioxan or tetrahydropyran, and removing the solvent.

The amount of rhenium heptoxide used in the preparation should be sufficient to provide a finished catalyst containing 0.1 to 40 parts of the oxide per 100 parts of alumina. The dry catalysts prepared by the process of the present invention are preferably activated before use by subjecting them to a thermal treatment, either in a stream of an inert gas such as nitrogen, carbon dioxide or helium, or preferably in a stream of air or oxygen followed by a final treatment with an inert gas. Suitably the catalysts are treated in air at a temperature in the range 300–900° C., preferably 300–600° C., for 1 minute to 20 hours and then under similar conditions with an inert gas such as nitrogen.

The catalysts prepared by the process of the present invention have a high activity and exhibit high selectivity in the disproportionation of acyclic oelfins. By the term "disproportionation" throughout the specification is meant the conversion of a feed hydrocarbon to a mixture of hydrocarbons having lower and higher carbon numbers than the feed hydrocarbons.

Acyclic olefins suitable as feed are $C_{3-30}$ alkenes, preferably $C_{3-8}$ straight-chain alkenes e.g. propylene, butene-1, butene-2, pentene-1, pentene-2, hexene-1, hexene-2, hexene-3, heptene-1, heptene-2, heptene-3, octene-1, octene-2, etc. Branch chain $C_{3-30}$ alkenes are also suitable feeds.

The process may be carried out batch-wise or in a continuous manner, using the catalyst in the form of a fixed bed, a fluidised bed or a moving bed. If desired the disproportionated product may be separated into fractions and selected fractions, e.g. unconverted feed or fractions not having the desired carbon number, may be recycled to the reactor.

The conditions under which the process is carried out may vary with the composition of the feed and the desired products. Reaction temperatures may range from −20° C. to +500° C., temperatures in the range 20° C. to 100° C. being preferred. As the temperature decreases from 150 to 20° C. the selectivity of the reaction increases. For example using butene-1, at lower temperatures in the range 150 to 20° C. the slectivity to ethylene and hexenes increase. Although disproportionation activity declines with reducing temperature significant activity is still achieved at temperatures as low as −20° C. Reaction pressures may be 0 to 2000 p.s.i.g. Reaction times may vary between 0.01 and second and 120 minutes, preferably between 0.1 second and 10 minutes. Suitable olefin/catalyst weight ratios are in the range 1:1000.

If desired the process may be effected in the presence of an inert diluent, for example paraffinic or cyclo-paraffinic hydrocarbons.

Catalysts prepared by the process of the present invention are also suitable for use in the codisproportionation of olefins and in the polymerisation of cyclic olefins.

The invention is illustrated by the following example.

(A) 1.4 grams of rhenium heptoxide in 50 millilitres of dry methanol were added to 10 grams of a commercial gamma alumina having a surface area of 250 square meters per gm.; a pore volume (<300 angstroms) of 0.37 ml. per gm.; and an average pore diameter of 50 angstroms. The slurry was then evaporated to dryness with stirring on a water-bath. The residual solid was dried at 110° C. for 2 hours then heated in dry air for 1 hour at 580° C. followed by dry nitrogen for 1 hour at 580° C., the air and nitrogen being passed over the catalyst at a GHSV of 2000, to produce catalyst A.

(B) The rhenium heptoxide-dioxan complex

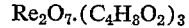
$$Re_2O_7 \cdot (C_4H_8O_2)_3$$

was dissolved in 50 millilitres of dioxan in an amount equivalent 1.4 grams of the rhenium heptoxide. The solution was added to 10 grams of a commercial alumina as used in the preparation of catalyst A. The slurry was evaporated, dried and heated as in the preparation of catalyst A, to produce a catalyst B.

(C) A solution of ammonium perrhenate in conductivity water is mixed with the commercial alumina used in the preparation of catalysts A and B to form a paste which is then dried at 110° C. for 12 hours. The catalyst is then heated in air at 580° C. for 1 hour and then in dry nitrogen at 580° C. for 1 hour to form a catalyst C. The proportions of ammonium perrhenate and alumina used were such as to produce a finished catalyst containing 1.4 parts of rhenium heptoxide per 10 parts of alumina.

Butene-1 is passed at 40° C. and at a GHSV of 4000 over each of the above catalysts for 30 minutes. The results are set out in the table below.

TABLE

| Product composition | Catalyst A | Catalyst B | Catalyst C |
|---|---|---|---|
| Percent molar: | | | |
| Ethylene | 14.3 | 17.0 | 11.5 |
| Propylene | 1.4 | 1.0 | 4.7 |
| Butene-1 | 71.0 | 68.5 | 75.4 |
| Butene-2 | Trace | Trace | 0.1 |
| Pentenes | 0.5 | 0.4 | 0.7 |
| Hexene-3 | 12.7 | 13.0 | 7.7 |
| Heptenes | Trace | Trace | Trace |
| Percent disproportionation of butenes | 29 | 31.5 | 24.6 |
| Mol percent selectivity to ethylene and hexenes | 93 | 95 | 78.2 |

It is clear that catalysts A and B, prepared according to the process of the present invention, have a greater selectivity and activity compared to that of catalyst C which is solely a comparative catalyst.

We claim:

1. A process for disproportionating an acyclic olefin which comprises contacting an acyclic olefin feed with a disproportionation catalyst under conditions of temperature and pressure which effect the disproportionation of the feed, said catalyst having been prepared by impregnating alumina with a solution of rhenium heptoxide in an inert organic solvent selected from the group consisting of aliphatic alcohols having 1 to 4 carbon atoms per molecule, aliphatic ketones and ethers having up to 4 carbon atoms per molecule, dioxan and tetrahydropyran, then removing said solvent.

2. A process according to claim 1 wherein the feed is a $C_{3-30}$ alkene.

3. A process according to claim 2 wherein the feed is a $C_{3-8}$ alkene.

4. A process according to claim 1 wherein disproportionation is effected at a temperature in the range −20° to +500° C.

5. A process according to claim 4 wherein disproportionation is effected at a temperature in the range 20°–100° C.

6. A process according to claim 1 wherein disproportionation is effected under a pressure in the range 0–2000 p.s.i.g.

7. A process according to claim 1 wherein the reaction time lies between 0.01 second and 120 minutes.

8. A process according to claim 7 wherein the reaction time lies between 0.1 second and 10 minutes.

9. A process according to claim 1 wherein the olefin/catalyst weight ratio is in the range 1000:1 to 1:1.

References Cited

UNITED STATES PATENTS 3,261,879  7/1966  Banks _____ 260—683
3,285,845  11/1966  Demeester _____ 208—27

FOREIGN PATENTS 1,054,864  1/1967  Great Britain.

OTHER REFERENCES

Blom, et al.: Rhenium Catalysts, Industrial and Engineering Chemistry, vol. 54, pp. 16–22, April 1962.

Broadbent, et al.: Rhenium Heptoxide, Journal of Organic Chemistry, vol. 24, pp. 1847–1854, December 1959.

DELBERT E. GANTZ, *Primary Examiner.*

C. E. SPRESSER, *Assistant Examiner.*

U.S. Cl. X.R.

252—461, 463; 260—666